United States Patent [19]

Sarkkinen

[11] Patent Number: 4,737,164
[45] Date of Patent: Apr. 12, 1988

[54] PROCESS FOR RECOVERING CONTAMINANTS FROM GASES

[75] Inventor: Veli Sarkkinen, Pori, Finland

[73] Assignee: Seinäjoen Kylmäkone A ja T Saikkonen Ky, Seinajoki, Finland

[21] Appl. No.: 759

[22] Filed: Jan. 6, 1987

[30] Foreign Application Priority Data

Jul. 6, 1984 [FI] Finland ............... 842732

[51] Int. Cl.$^4$ ............... B01D 53/04; B01D 53/32
[52] U.S. Cl. ............... 55/9; 55/11; 55/59; 55/74; 55/208
[58] Field of Search ............... 55/2, 6, 9, 11, 59, 55/62, 68, 74, 208, 387

[56] References Cited

U.S. PATENT DOCUMENTS

| | | | |
|---|---|---|---|
| 1,325,124 | 12/1919 | Strong | 55/6 |
| 2,815,320 | 12/1957 | Kollsman | 55/2 X |
| 2,854,394 | 9/1958 | Kollsman | 55/2 X |
| 4,010,100 | 3/1977 | Suslick | 55/2 X |
| 4,046,525 | 9/1977 | Matsuo et al. | 55/59 |
| 4,234,326 | 11/1980 | Bailey et al. | 55/387 X |
| 4,414,003 | 11/1983 | Blaudszun | 55/59 X |
| 4,421,532 | 12/1983 | Sacchetti et al. | 55/59 X |

FOREIGN PATENT DOCUMENTS

| | | | |
|---|---|---|---|
| 1029116 | 5/1953 | France | 55/6 |
| 126670 | 10/1979 | Japan | 55/387 |
| 11073 | 1/1980 | Japan | 55/387 |
| 167716 | 10/1982 | Japan | 55/387 |

Primary Examiner—Robert Spitzer
Attorney, Agent, or Firm—Finnegan, Henderson, Farabow, Garrett & Dunner

[57] ABSTRACT

A process for recovering volatile inorganic and organic impurities from gases using a layer of fibrous activated carbon for adsorbing the impurities while applying an electric voltage, preferably a DC voltage, across the fibrous layer to improve its adsorption capacity, and then desorbing the impurities from the layer by first increasing the temperature of the layer and then passing an inert gas through the activated carbon to desorb the adsorbed impurities.

6 Claims, 1 Drawing Sheet

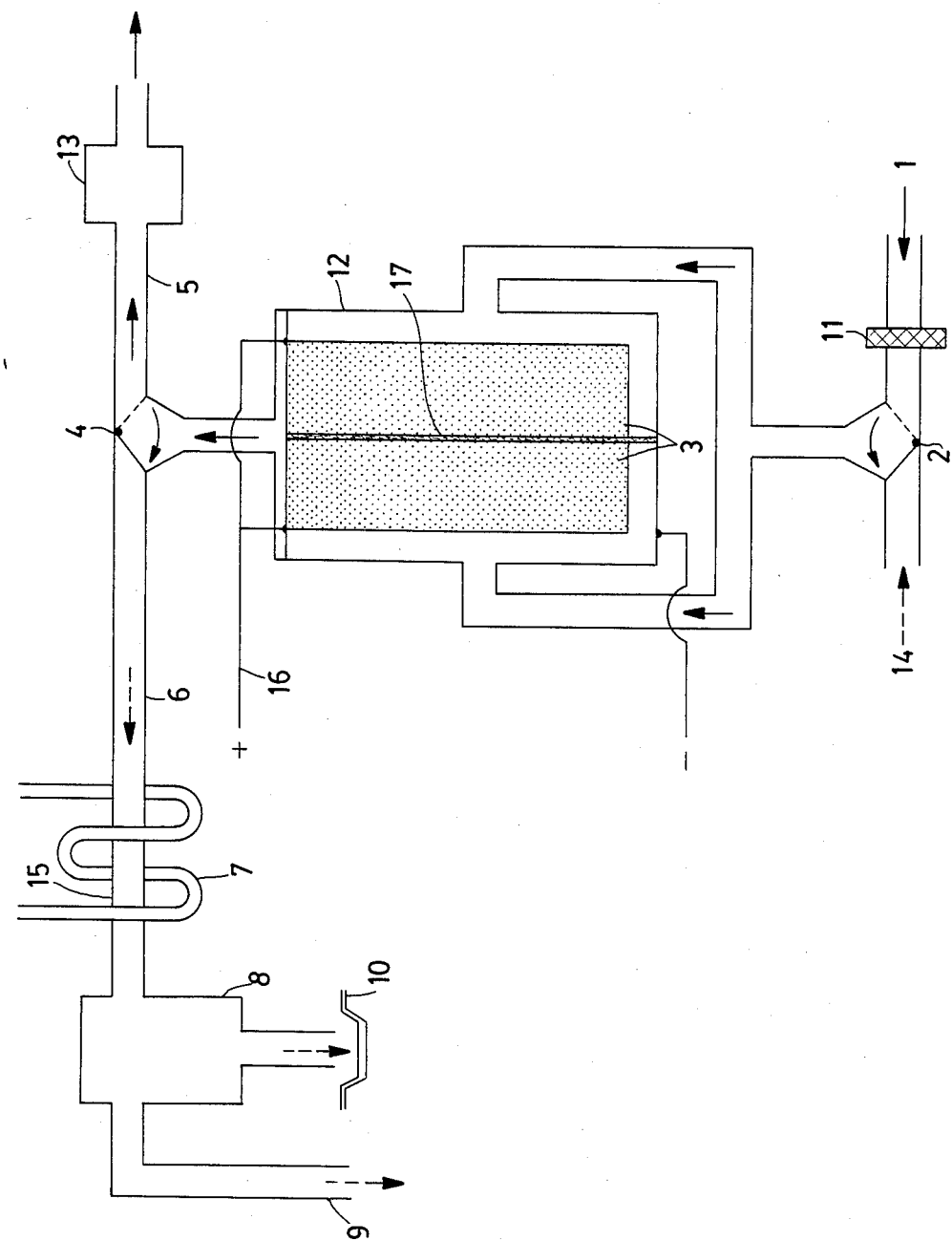

PROCESS FOR RECOVERING CONTAMINANTS FROM GASES

The present invention relates to a process for recovering impurities from gases and relates more particulary to a process for recovering volatile inorganic and organic compounds by adsorbing said compounds onto activated carbon.

The expanding significance of environmental and atmospheric control has made the removal of small amounts of contaminants contained in exhaust air and process waters of industry evermore timely. Said contaminants comprise, in addition to inorganic compounds of, e.g. heavy metals, also a plurality of organic compounds and especially volatile organic and inorganic compounds, such as various solvents. These widely differing compounds may occur in exhaust air in extremely varying concentrations.

Granulated activated carbon has been used for adsorbing gaseous impurities for a long time. However, the granular activated carbon used has some drawbacks:

(a) Solvents with a high boiling point (bp. 170° C.) do not evaporate together with the stripping steam during the regeneration process of the activated carbon but, due to the porous structure of the granular carbon, are retained in the carbon causing fast clogging.

(b) Furthermore, due to the porous structure, the contact time, i.e. the time which is required for the adsorption to occur, is relatively long and consequently, handling of large quantities of air containing but small amounts of contaminants leads to oversized and thus unprofitable installations.

A new grade of fibrous activated carbon, available from, e.g. Charcoal Cloth Ltd, has a different surface structure. The macroscopic pores, so typical for the granular activated carbon, are totally absent and the microscopic pores are located close to the surface. The fibrous active carbon is commercially available in the form of a flexible fabric under the trademark "Charcoal Cloth".

Said fibrous activated carbon has been used, e.g., for recovering gold from solutions. In this context reference is made to WO Patent Application No. 82/01196. It has been observed that the adsorption and stripping stages take place more quickly and at a better overall efficiency when using fibrous activated carbon than by means of normal grade activated carbon. Furthermore, gold deposited on the activated carbon fibres can be directly recovered by electrolysis. In this process, the loaded fibrous body is placed in an electrolyte containing NaOH and NaCN to form an anode, the cathode being a titanium electrode. Gold is deposited on the cathode when an electric current is passed through the electrolyte.

Recent observations indicate that fibrous activated carbon is excellently applicable to separating contaminants from gaseous phases. Thanks to the open structure of the fibrous carbon, an appreciably shorter contact time is achieved than with granular activated carbon. The desorption energy is lower and, consequently, the desorption of solvents with high boiling points is also possible.

In the present process, the novel and surprising feature resides in the observation that the adsorption capacity (capability) of fibrous activated carbon, though reasonably high per se, may be further improved by applying a voltage, preferably a DC voltage, across the fibrous layer. Due to said voltage, the fibers are polarized, which improves their affinity, especially towards polar molecules.

More particulary, it is an object of the present invention to provide a process for recovering contaminants, preferably volatile inorganic and organic compounds, from gases, which comprises using a layer of fibrous activated carbon as adsorbent for said contaminants, applying an electric voltage across said fibrous layer to improve its adsorption capabilities, and, optionally, desorbing said impurities from said layer of fibrous activated carbon.

The process in accordance with the invention offers substantial benefits. For instance, the adsorption material can be adapted to handling large volumes of gas containing small amounts of contaminants without resorting to oversized equipment. Thanks to the short contact time and short desorption time, a short operating cycle in a continuously operating recovery system can be achieved. This furthermore diminishes the required size of the equipment because the same amount of activated carbon is used more often per time unit.

A low desorption energy also facilitates regeneration with a hot gas, for instance, an inert gas. This also allows the recovery of:

water-soluble solvents solvents that might decompose when exposed to stripping steam, and solvents that must be dried for further use.

The activated carbon adsorbs between 80 and 99% of the aircarried contaminant depending on the prevailing conditions, e.g. the air flow rate, the character of the contaminant and its concentration, the temperature of the air and its relative humidity. On a weight basis, the fibrous activated carbon is capable of absorbing contaminants up to between 1 and 50% of its weight.

According to a preferred embodiment, the process in accordance with the invention is employed for recovering water-soluble liquids, such as alcohols, ketones, and other solvents, particularly those of polar character. In said embodiment inert gases rather than steam are used for stripping the solvent. The fibrous activated carbon layer is first heated in order to vaporize the adsorbed liquid, whereupon a flow of an inert gas is conducted through it. Nitrogen and argon may be mentioned among the preferable inert gases. Carbon dioxide, which in this context may be considered as an inert gas, is also applicable. Another preferable inert gas comprises flue gas, from which most of the oxygen has been removed, e.g., by combustion.

The heating of the layer may be carried out by applying electric current, preferably AC current, across the layer. Preferably an AC current with a magnitude of at least 5 A (220 V) is connected to the activated carbon. Alternatively, the heating is accomplished by means of electric resistors serving as heating elements fitted within the layer of activated carbon. Said resistors may, by way of an example, comprise conventional tubular heating elements having a resistance wire mounted within a core of copper or stainless steel, and further provided with a layer of MnO between the core and the resistance wire. The resistance wire consists preferably of a NiCr or FeCrAl alloy.

By means of the afore-mentioned embodiment fast desorption of the adsorbed contaminant is attained, and the watersoluble solvent can be recovered in anhydrous form without a separate distillation stage.

The invention will be examined below in more detail with the aid of the attached drawing which depicts in a diagrammatic form a gas cleaning and recovery process in accordance with the present invention.

Solvent-containing air 1 is fed via a prefilter 11 and a three-way valve 2 to an adsorber 12, which contains two layers of fibrous activated corbon 3, e.g., grade Charcoal Cloth, each configured in the form of a cylinder. The cylindrical layers 3 are separated from each other by means of an insulating wall 17. Each of the cylinders has 2-5 layers wound on one another and the surface of the fibrous activated carbon layer 3 is prepared such as to make the air-flow velocity through the layers to be between 0.5 and 1 m/s.

The purpose of the prefilter 11 (a proper grade being, for instance, American Air Filter) is to remove from the air the particulate impurities which could permanently clog the activated carbon filter if allowed to reach that far.

The inlet air temperature to the adsorber 12 must not exceed 30° C. (303 K.).

The air exits from adsorber 12 through three-way valve 4 and duct 5 to sensors 13.

The concentration of the residual solvent in air which has passed through the layer of fibrous activated carbon, is measured by means of sensors 13, whose operation may, for instance, be based on the conductivity change of a semiconductor as a function of the solvent concentration.

To improve the desorption process, a DC voltage 16 is connected to the layers of fibrous carbon 3 by means of electrodes, one of which is attached to the carbon layer 3 and another to the metal wall of the adsorber 12.

When the solvent concentration of adsorber outlet air 5 has reached a preset value, which is, for instance, 1-5% of the concentration of the inlet air 1, the activated carbon having reached the upper limit of its dynamic capacity is regenerated. The regeneration is performed, for instance, by introducing via an inlet conduit 14 and a three-way valve 2 a low-pressure steam flow through the fibrous activated carbon for 1-10 minutes.

The steam strips most of the solvent from the fibrous carbon. The steam consumption is 4-5 kg steam/kg solvent.

The stripping steam is fed through valve 4 and a duct 6 to a condenser 15, where the steam is cooled by a cooling coil 7 (using, e.g. cold water as a coolant). The condensed mixture consisting of solvent and water is fed to a water separator 8, from which the recovered solvent is lead via an exit pipe 9 to a storage tank and the separated water to a sink 10.

As mentioned above, in a preferred embodiment the solvent is stripped from the fibrous carbon by first heating the layer 3 either by applying electric current across it or by means of electic heating elements fitted therein, and thereafter conducting a flow of inert gas via the inlet conduit 14 and the three-way valve 2 through the layer 3. The stripping gas is in this case subsequently cooled in the same condenser 15 as the gas mixture obtained from steam stripping.

The inert gas used may be derived from flue gas by removing most of its oxygen by combustion. Nitrogen, carbon dioxide, argon, etc., are also applicable as inert gases.

When using electric current or especially when electric resistors are used for heating the layer the regeneration cycle may comprise four stages:

The adsorber 12 is first purged with nitrogen until the concentration of oxygen decreases below 10% (first stage). Residual water contained in the layer of activated carbon is thereafter removed by conducting through the layer 3 a flow of hot nitrogen gas, the temperature of which is about 150° C. The water is adsorbed onto silica gel (second stage). The layer of fibrous active carbon is then heated by current or heating elements (not shown in the drawing) fitted in said layer. The heating elements are operated by AC or DC current. The adsorber 12 is purged with hot nitrogen gas, whereby the solvent is stripped off and subsequently condensed in the condensor 15 (third stage). When a suitable amount of solvent contained in the nitrogen has been condensed, the $H_2O$ contained in the silica gel may be returned to the carbon by blowing hot air through the gel (stage four).

The duration of each of the four different stages of the above cycle may be, e.g., 2, 2, 10 and 1 minutes, respectively.

In an exemplifying embodiment an adsorbing unit was built comprising two cylindrical layers of fibrous activated carbon grade "Charcoal Cloth" forming channels for the air flow. Each layer contained 5.0 kg carbon, and the diameter and length of said cylindrical layer were 40 cm and 150 cm, respectively. The pressure drop in the channel was approx. 0.4 kPa at the flow rates used.

A DC current was applied to the fibrous activated carbon such that a voltage differential of 200 V was achieved between the layer 3 and the container 12.

The fibrous activated carbon package was attachable to an electric current to make its temperature adjustable. The stripping was performed by conducting an electric current of 5 A through the carbon and stripping it with an inert gas heated to about 150° C.

For comparison, an adsorber based on granular activated carbon was constructed with the principal dimensions given below:

| | |
|---|---|
| Activated carbon content (granular grade) | 100 kg |
| Activated carbon bed thickness | 40 cm |
| Activated carbon grade NucharWv-H 4 × 10 | |
| Pressure differential of adsorber | 1 kPa |
| Adsorber outer dimensions: dia. 95 cm, height 55 cm | |

The adsorber was provided with a three-way valve in order to feed exhaust air or low-pressure steam through it, the latter for desorption.

The efficiencies of both of the adsorbers were tested for trichloroethylene and isopropanol.

The results of said test are indicated in the below tables. In each case column A gives the results for the adsorber using fibrous activated carbon, whereas column B shows the results for the granular activated carbon adsorber. The test rsults were as follows:

| | Trichloroethylene: | | | |
|---|---|---|---|---|
| | 1A | 1B | 2A | 2B |
| Inlet flow [m³/h] | 1200 | 1200 | 9600 | 9600 |
| Concentration of solvent [g/l] | 4.6 | 4.6 | 0.6 | 0.6 |
| Cycle length [min] | 5 | 120 | 5 | 120 |
| Yield [%] | 96.6 | 95.2 | 85.3 | 44.9 |

-continued

| | Trichloroethylene: | | | |
|---|---|---|---|---|
| | 1A | 1B | 2A | 2B |
| Purity of the stripped solvent [%] | 99.95 | 99.8 | 99.95 | 99.7 |
| Concentration of the solvent in the air [mg/m$^3$] | 155 | 220 | 90 | 330 |

1A & 2A: fibrous activated carbon
1B & 2B: granular activated carbon

| | Isopropanol: | |
|---|---|---|
| | 3A | 3B |
| Inlet flow [m$^3$/h] | 1200 | 1200 |
| Concentration of solvent [g/l] | 4.0 | 4.0 |
| Cycle length [min] | 12 | 120 |
| Yield [%] | 96.9 | 96.4 |
| Purity of the stripped solvent [%] | 99.6 | 21.6 |
| Concentration of the solvent in the air [mg/m$^3$] | 125 | 145 |

3A: fibrous activated carbon
3B: granular activated carbon

Since isopropanol is water-soluble the purity of the stripped solvent was poor.

The tests indicate the following:

By reducing the carbon bed to 1/10 when using the fibrous activated carbon, the adsorber could be constructed smaller, and a lower pressure differential was also achieved.

Yield and purity of stripped solvents was higher for items 1 and 2 than using granular activated carbon, with an essentially higher yield for item 2.

The water-soluble solvent, isopropanol, could be recovered in anhydrous form without distillation stages.

In addition to the afore-mentioned materials, the fibrous activated carbon adsorber is also applicable for recovering the oxides of nitrogen and sulphur ($NO_x$ and $SO_x$, respectively). The process in accordance with the invention may therefore be employed, for instance, also for purifying auto-motive exhaust gases and flue gases from fossil-fueled power plants.

What is claimed is:

1. A process for recovering volatile impurities from gases which comprises, passing the gas through a layer of fibrous activated carbon acting as an adsorbent for said impurities while applying an electric voltage across said fibrous layer to improve its adsorption capacity and thereafter desorbing said impurities from said layer of fibrous activated carbon.

2. The process of claim 1, wherein the fibrous activated carbon is in the form of carbon fiber cloth.

3. The process of claim 1, wherein a DC voltage is applied to the activated carbon.

4. The process of claim 3, wherein the DC voltage is about 200 V.

5. The process of claim 1 for recovering water-soluble organic solvents from exhaust air, wherein to desorb the solvents, the activated carbon is first heated to increase its temperature, after which an inert gas, selected from the group consisting of nitorgen, argon, carbon dioxide, and deoxygenized flue gas, is passed through the activated carbon to desorb the adsorbed solvent impurities.

6. The process of claim 5, wherein the activated carbon is heated by applying an AC current with a magnitude of at least 5 A to it.

* * * * *